Jan. 2, 1934. G. H. GJERTSEN 1,941,551
STAYBOLT CAP REMOVING TOOL
Filed Feb. 27, 1930 2 Sheets-Sheet 2
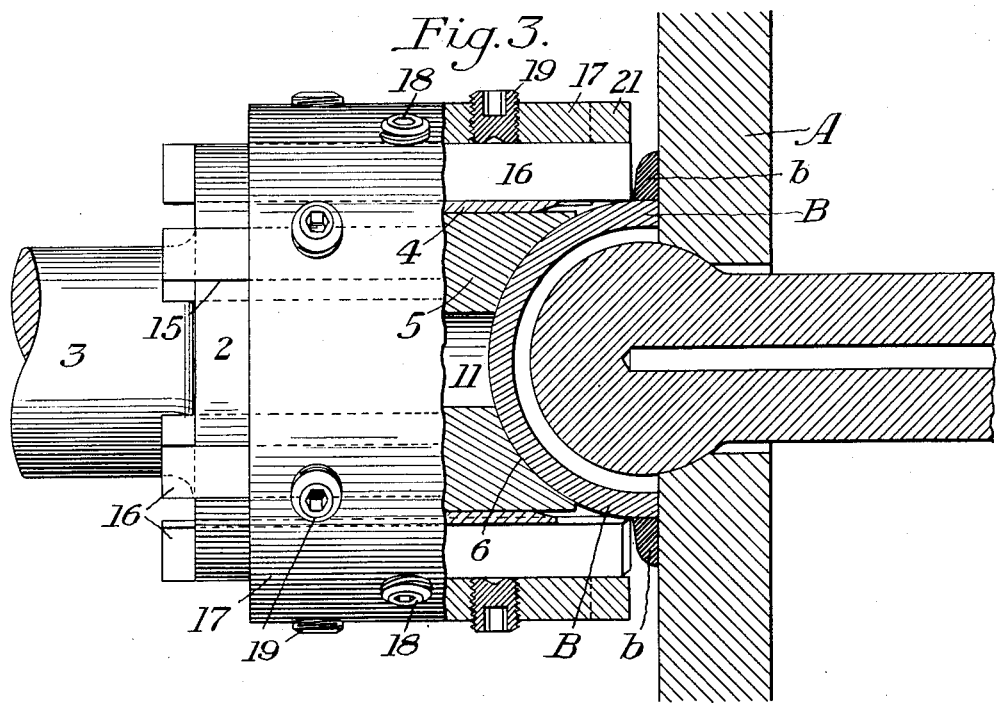
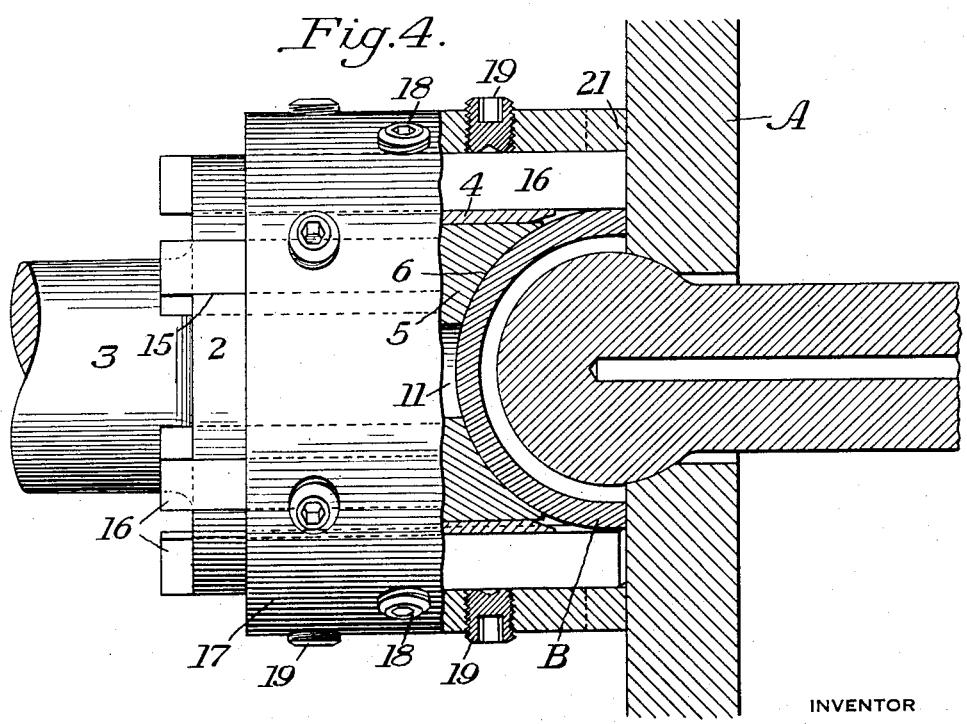
INVENTOR Patented Jan. 2, 1934

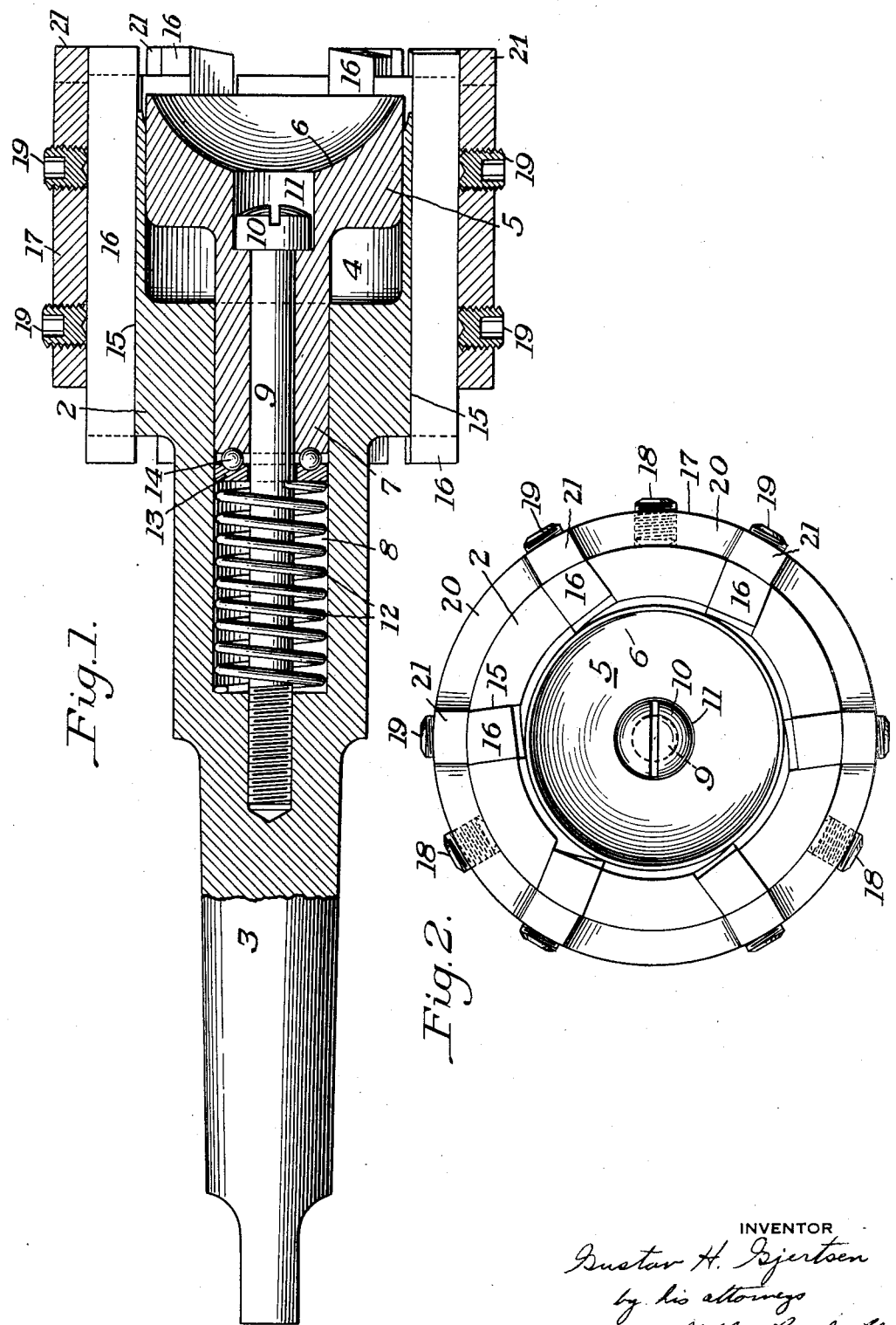

1,941,551

UNITED STATES PATENT OFFICE 1,941,551

STAYBOLT CAP REMOVING TOOL

Gustav H. Gjertsen, St. Paul, Minn., assignor to Flannery Bolt Company, Pittsburgh, Pa., a corporation of Delaware Application February 27, 1930. Serial No. 431,722

4 Claims. (Cl. 29—105)

This invention is for a tool for removing caps from over the heads of flexible staybolts and like purposes.

Certain types of staybolts, such for instance, as those disclosed in United States Patent No. 1,359,819, dated Nov. 23, 1920, have a head which passes through the cover sheet or plate of the boiler to which the bolt is applied, and the rounded head of the bolt bears directly against the outer surface of this plate. The joint between the bolt and the head is not tight so that it is necessary to apply a cap to the outer surface of the cover plate over the head of each bolt. This cap is generally in the form of a spherical cup and is secured to the cover sheet by means of welding, metal being welded onto the plate and the cap around the outside of the cap at the point where the cap contacts with the plate. In repairing boilers having staybolts of this type it is necessary to cut away this metal which has been welded on in order to free the cap from the boiler plate and give access to the head of the bolt. Moreover, this operation must be done by some portable tool that can be held in place against the boiler under repair.

According to the present invention there is provided a tool by means of which a weld can be quickly and conveniently cut away without likelihood of damage to the boiler itself and even without mutilation of the caps. A tool provided in accordance with the present invention can be conveniently used and can be easily centered on the cap to be removed and can be conveniently sharpened from time to time.

The invention may be readily understood by reference to the accompanying drawings in which Figure 1 is a longitudinal vertical section through one form of tool constructed in accordance with my invention;

Figure 2 is an end view of the cutter and of the tool;

Figure 3 is a side elevation partly in section of the cutting end of the tool in the position of first application to the cap; and Figure 4 is a view similar to Fig. 3 showing the tool at the completion of the cutting operation.

In the tool shown in the drawings there is a main body member 2 which constitutes the cutting head of the tool. This body is provided with a central shank 3 formed integral therewith, and the shank is preferably so shaped that it can be used in the tool holder of standard machines, such for instance, as the tool socket of the air motor commonly used around railroad repair shops. In the working face of the body 2 is a relatively deep cavity 4 within which is a centering head 5, this centering head having a spherical face 6 adapted to conform substantially to the outer curvature of the staybolt cap on which the tool is designed to be used.

The centering head 5 has a shank portion 7 which is slidably and rotatably received in a center bore 8 in the body of the tool. The member 5 is retained in place by means of an axially extending bolt 9 having a head 10 which is received in a central recess 11 in the centering head 5. Confined within the shank of the tool is a compression spring 12 bearing against a collar or washer 13. A series of balls providing a ball-bearing 14 is interposed between the washer 13 and the end of the shank 7 of the centering head. By reason of this arrangement the centering head may be pushed back against the compression of the spring 12, and the body of the tool 2 may also rotate about the centering head 5. The head 10 of the bolt 9 limits the extent to which the centering head 5 can be pushed out by the thrust of the spring 12.

Formed in the outside of the body 2 are a plurality of longitudinally extending grooves 15 into which are set cutter bits 16. A removable bushing 17 is fitted around the body 2 and is preferably removably held in place by means of a series of flush set screws 18, as best shown in Figure 2. The bushing 17 also carries flush set screws 19 which bear against the cutter bits 16, as clearly shown in Figure 2.

The end of the sleeve or bushing 17 projects beyond the end of the body 2 and preferably has cut away portions 20 in its lower edge providing in effect an annular series of spaced apart fingers or lugs 21. In the preferred embodiment there is one of these lugs 21 adjacent each cutter bit 16. As shown in Figure 2 of the drawings, the cutting edge of each of the cutters 16 is radial to the center of the tool.

In the operation of the tool, the tool is placed in the tool socket of some motor adapted to revolve it. The tool is brought into position over the staybolt cap to be removed and pushed in against the cap, as shown in Fig. 3. The spherical face 6 of the cap engaging the top of the cap tends to center the tool with respect to the cap. The tool is then revolved, and as it is revolving it is pushed in. As it is pushed in, the centering head 5, which is against the top of the cap, cannot move, so that the cutting head 2 moves inwardly toward the cover sheet or plate A of the boiler. The cap to be removed is designated B, while b indicates the metal of the weld which is to be cut away. When the cutting head has been pushed in a sufficient distance the cutters engage the metal b and as the tool is fed inwardly the metal is cut away. The cutting edges of the cutters are flush with the ends of the lugs 21 on the bushing 17. Consequently, at the time the cutters reach the surface of the sheet or plate A, the ends of the lugs come into contact with the plate and prevent the cutters from cutting deeper. The notches 20 between the lugs 21 permit the chips of metal to come away and clear the cutters.

It will thus be seen that the tool permits the removal of just the metal which is necessary to free the cap B from the plate A without permitting the cutters to damage the plate A. The lugs 21 also prevent the cutters from cutting into the plate A in the event of the tool being brought against the work in any other position than one perpendicular to the plate A. For instance, if the tool is canted up or down as viewed in Figure 3 and the tool fed in to remove the weld, the edge of the fingers or lugs 21 will engage the plate A before the cutter can engage it.

To sharpen the cutter bits 16 it is merely necessary to loosen the set screws 19 and allow the cutters to drop out. In assembling the tool for use after the cutters have been sharpened it is merely necessary to set it in a vertical position on a smooth flat surface and then drop the cutter bits 16 into the slots 15 from the top of the tool. The cutter bits will drop until the cutting edges come into contact with the surface on which the lugs 21 rest. In this way the cutting edges of the several bits can be easily set to a position where they are flush with the ends of the lugs or fingers 21.

The cutters can likewise be easily replaced when worn out or broken. The bushing 17 can be adjusted on the body 2 through the operation of the set screws 18 and as the fingers or lugs forming the guard edge of the bushing wear down, the bushing can be set down further on the body. This bushing or sleeve can also be replaced when necessary without replacing the entire tool.

The centering feature in addition to providing a convenient means for centering the tool on the cap, serves the purpose of protecting the points of the cutters from damage when the tool is first placed over the cap, as the compression of the spring on the centering device holds the tool out away from the metal to be cut until the tool has been centered and until the tool is operating at a sufficiently high speed, after which the cutting portion of the tool can be fed in gradually toward the metal to be cut away. Inasmuch as this is done against the compression of the spring, the feeding in is gradual, preventing the cutters from being brought too abruptly against the metal to be removed and offering a resistance to too rapid feeding of the tool.

The provision of the ball bearing between the stationary centering device and the revolving tool practically eliminates end thrust friction between the end of the shank 7 and the spring-pressed washer 13.

To remove the centering head for repair or replacement it is merely necessary to unscrew the central bolt 9. This permits the centering head to be removed and also permits the ballbearings 14 and the springs 12 to be taken out.

While the tool is specially adapted for the removal of caps from over the heads of flexible stay-bolts in boiler assemblies, it will be understood that the tool is not necessarily limited to this use, and can be used for other purposes where a generally similar character of work has to be performed. It will also be understood that while I have described in detail a preferred embodiment of my invention, the invention is not restricted to the particular construction shown and may be otherwise embodied within the contemplation of the following claims.

I claim as my invention:

1. In a tool of the class described, a body having a head portion and a shank portion, the head portion of the body having longitudinally extending slots therein, cutter bits received in the slots, and a sleeve surrounding the head portion of the body and secured thereto, said sleeve having cutter bit securing means thereon for retaining the cutter bits in position in the slots in the head portion of the body, said sleeve having a series of fingers at the end thereof projecting beyond the end of the body, said cutter bits also projecting beyond the same end of the body.

2. In a tool of the class described, a body having a head portion and a shank portion, the head portion of the body having longitudinally extending slots therein, cutter bits received in the slots, and a sleeve surrounding the head portion of the body and secured thereto, said sleeve having cutter bit securing means thereon for retaining the cutter bits in position in the slots in the head portion of the body, said sleeve having a series of fingers at the end thereof projecting beyond the end of the body, said cutter bits also projecting beyond the same end of the body, said body having a central cavity therein, a centering head within the body, a central bolt in the body with respect to which the centering head has a limited longitudinal movement, a spring within the body for resiliently urging the centering head outwardly, said centering head also being rotatable within the body.

3. In a tool of the class described, a body having a head portion and a shank portion, the head portion of the body having longitudinally extending slots therein, cutter bits received in the slots, and a sleeve surrounding the head portion of the body and secured thereto, said sleeve having cutter bit securing means thereon for retaining the cutter bits in position in the slots in the head portion of the body, said sleeve having a series of fingers at the end thereof projecting beyond the end of the body, said cutter bits also projecting beyond the same end of the body, said body having a central cavity therein, a centering head within the body, a central bolt in the body with respect to which the centering head has a limited longitudinal movement, a spring within the body for resiliently urging the centering head outwardly, said centering head also being rotatable within the body, a ballbearing being operatively disposed between the centering head and the spring.

4. A cutting tool comprising a body portion and a shank portion, there being axial grooves in the body portion for receiving cutters, a bushing surrounding the body portion, and means in said bushing for engaging cutters in said grooves for securing them relative to said body portion, the end of the body portion having an inwardly opening cavity therein, there being a bore extending axially of the shank from said cavity, a bolt extending axially through said bore and into said cavity, a centering head having an enlarged portion slidable in said cavity and a shank portion slidable in said bore on said bolt, a spring in said bore for forcing said head outwardly, and a thrust bearing between the spring and the shank of said head.

GUSTAV H. GJERTSEN.